United States Patent
Pipes

[15] 3,655,074
[45] Apr. 11, 1972

[54] WAREHOUSE APPARATUS WITH AN AIRBEARING SUPPORTED STACKER

[72] Inventor: George R. Pipes, South Euclid, Ohio
[73] Assignee: Eaton Corporation, Cleveland, Ohio
[22] Filed: Dec. 8, 1969
[21] Appl. No.: 882,917

[52] U.S. Cl. .................................. 214/16.4 A, 104/23 FS
[51] Int. Cl. .................................................... B65g 1/06
[58] Field of Search ............................ 214/16.42, 660–670; 104/23 FS

[56] References Cited

UNITED STATES PATENTS

| | | | |
|---|---|---|---|
| 3,167,145 | 1/1965 | Mackie | 104/23 FS |
| 3,202,232 | 8/1965 | Rogers | 214/670 X |
| 3,238,894 | 3/1966 | Maksim | 104/23 FS |
| 3,239,022 | 3/1966 | Dolphin | 214/670 X |
| 3,432,040 | 3/1969 | Gaasbeck | 104/23 FS |
| 3,445,009 | 5/1969 | Burch | 214/16.4 B |
| 3,526,327 | 9/1970 | Atwater | 214/16.4 B |

FOREIGN PATENTS OR APPLICATIONS

| | | | |
|---|---|---|---|
| 257,298 | 9/1964 | Australia | 214/16.4 A |
| 1,008,071 | 10/1965 | Great Britain | 214/16.4 A |

*Primary Examiner*—Gerald M. Forlenza
*Assistant Examiner*—R. B. Johnson
*Attorney*—Teagno and Toddy

[57] ABSTRACT

Relates to a storage and retriever stacker movable between a pair of storage racks for projecting or retracting a load into or off of the racks. The stacker is supported on air bearing means and is provided with means for horizontal guidance during movement between the racks.

4 Claims, 5 Drawing Figures

PATENTED APR 11 1972
3,655,074
INVENTOR
GEORGE R. PIPES
ATTORNEYS
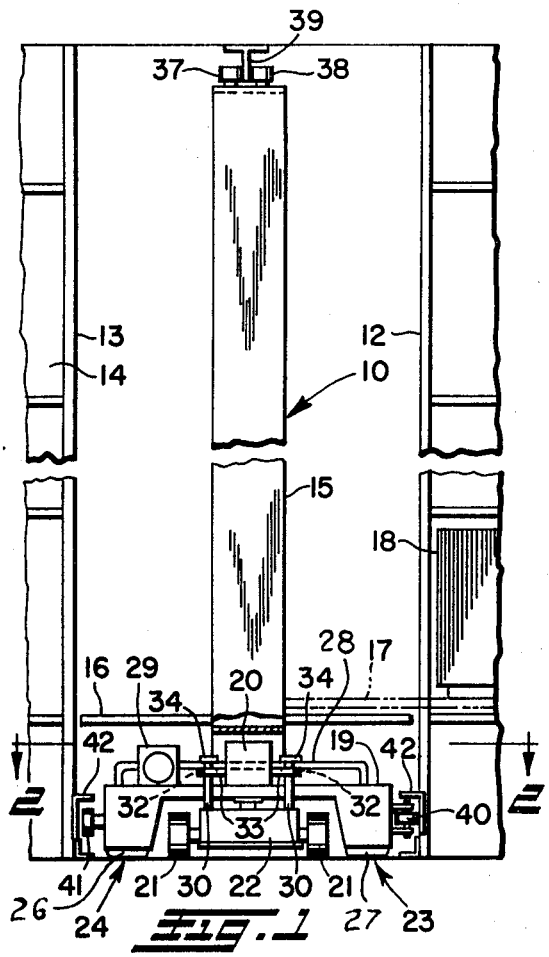
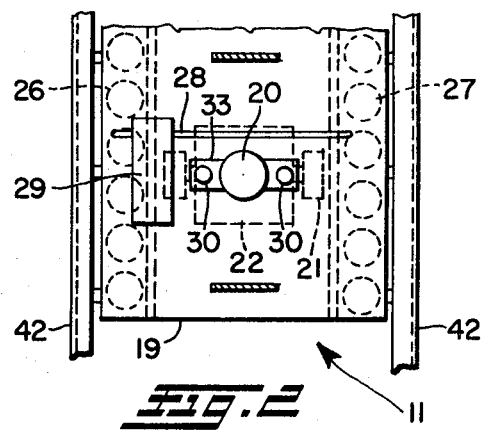
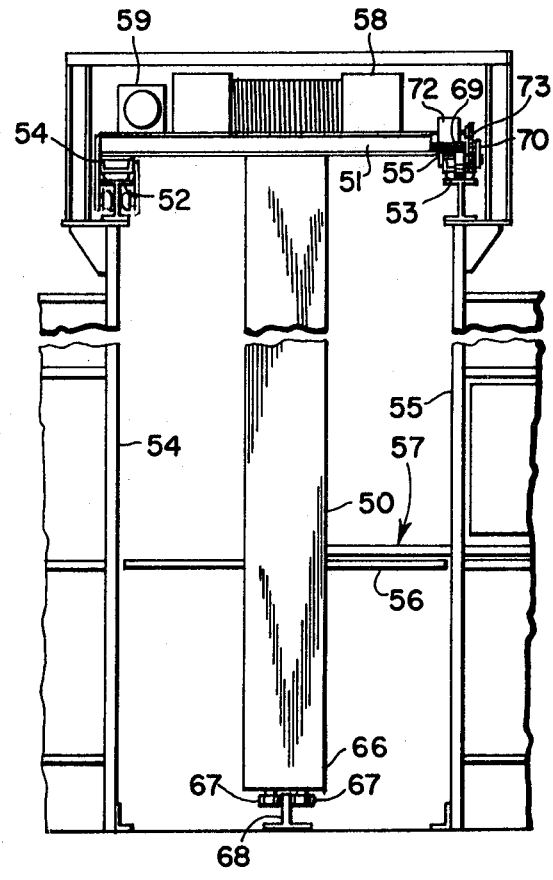
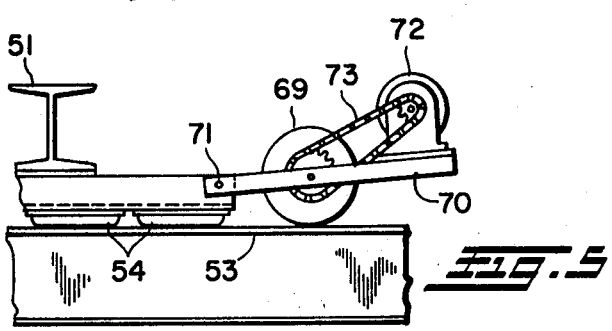

WAREHOUSE APPARATUS WITH AN AIRBEARING SUPPORTED STACKER

This invention relates to materials handling apparatus and more particularly to a stacker and rack mechanism adapted for automatic operation for storing and unstoring loads by transferring them between a movable load carrier and a storage rack.

The apparatus in which the stacker operates comprises a storage frame or rack having vertically and horizontally arranged load support means opening at a generally vertical work face and disposed along a travel zone or aisle. The stacker is movable along the aisle and is provided with a load carrier mounted on an elevator or hoist for vertically moving the carrier and the load to different levels in the storage frame. The carrier in turn is provided with a lateral extensible retractor for inserting or retrieving loads into and from the storage frame at either side of the stacker.

An object of the invention is to provide a supporting structure for a stacker along an aisle between storage racks including air float devices enabling the stacker to be positively positioned while a load is inserted into or retrieved from the storage racks and facilitating the control of vertical alignment of the stacker during movement along the aisle.

A further object of the present invention is to provide a stacker and rack apparatus of the above-described type with means for positively guiding the stacker during movement of the stacker along the aisle.

Other objects and advantages will become readily apparent from the following detailed description when read in connection with the accompanying drawings, in which:

FIG. 1 is a vertical view with parts broken away and in cross-section showing one embodiment of the invention.

FIG. 2 is a cross-sectional view taken along the lines 2—2 of FIG. 1.

FIG. 3 is a view similar to FIG. 1 of another embodiment of the invention.

FIG. 4 is an enlarged cross-sectional view taken along the line 4—4 of FIG. 3.

FIG. 5 is a side elevational view of the trolley drive of the embodiment of the invention shown in FIG. 3.

While this invention is susceptible of embodiment in several different forms, there is shown in the drawings and will herein be described in detail two embodiments of the invention with the understanding that the present disclosure is to be considered as an exemplification of the principles of the invention and is not intended to limit the invention to the embodiments illustrated.

The stacker assembly 10 illustrated in FIGS. 1 and 2 operates in a work aisle 11 situated between rows of racks 12 and 13 of conventional construction and having a plurality of tiers of load receiving spaces 14. The stacker 10 is adapted to move longitudinally of the work aisle 11 and has a mast 15 of conventional construction on which a carriage 16 is vertically movable. The carriage 16 is provided with an extensible load retractor 17 for supporting a load 18 centrally of the work aisle 11, and for projecting the load 18 into a load opening in the racks 12 and 13, as shown in FIG. 1.

The stacker mast 15 is supported on a carriage base frame 19 positioned below the load carriage 16. The carriage or base frame 19 is provided with a traction assembly comprising a motor 20 driving a pair of traction wheels 21 through a speed reduction unit 22. The motor 20 is reversible for driving the stacker in either direction within the work aisle 11.

Supporting surfaces 23 and 24 may comprise the floor between the racks 12 and 13 or other substantially flat horizontal surfaces situated parallel to the racks 12 and 13 and adjacent to each rack. A plurality of air float devices 26 and 27 are preferably located at the longitudinal edges of the frame 19 and parallel to the racks 12 and 13. A series of air float devices 26 and 27 are supplied with pressurized air by means of conduits 28 from a motor compressor unit 29 mounted on the frame 19. The motor compressor unit 29 is preferably operated simultaneously with operation of the motor 20 to supply compressed air to the air float devices 26 and 27 whenever the stacker is moved. Thus, the entire stacker 10 is supported on the surface 23 and 24 by a film of air via the air float devices 26 and 27.

The traction assembly is floatably mounted relative to the frame 19 to permit relative vertical movement between the traction wheel 21 and the frame 19 when the air float devices 26 and 27 are activated and deactivated. The floatable mount comprises a plurality of studs 30 secured to the speed reduction unit 22 which project through holes 31 in the frame 19 and holes 32 in morot lugs 33 with the stud heads 34 positioned a slight distance above the lugs 33. Thus the studs 30 transmit reaction forces of the motor 20 to the frame 19, permit vertical movement of the traction assembly relative to the frame 19 and, also, maintain the axis of the wheels 21 in a transverse position relative to the direction of movement of the stacker.

The upper end of the stacker is provided with transversely spaced guide rollers 37 and 38 engaging a guide rail 39 which is located centrally of the aisle 11 and vertically above the racks 12 and 13. The rollers 37 and 38 contact the sides of the guide rail 39 to stabilize the mast transversely of the aisle.

The base of the stacker is provided with guide rollers 40 and 41 which in turn ride within appropriate guide channels 42 located at the base of each of the racks 12 and 13. It is thus seen that the stacker can move from any position in the work aisle 11 horizontally to any other position and whenever the stacker 15 is stopped air supplied to the air float devices 26 and 27 ceases so that the entire stacker crane is positively and firmly positioned at any location along the work aisle 11.

Referring to FIGS. 3 and 4 of the drawings, a modification of the invention is shown wherein the stacker mast 50 depends from a carriage or trolley 51 adapted to move longitudinally to supporting surfaces 52 and 53 mounted at the upper end of the racks 54 and 55. The mast 50 is provided with a load carriage 56 having a load extractor 57 operable in a manner similar to the extractor in FIG. 1 of the drawings. The load carriage 57 is raised and lowered relative to the mast 50 by hoist mechanism 58 located at the top of the carriage or the trolley 51.

The trolley or carriage 51 is supported on the supporting surfaces 52 and 53 by a plurality of air float devices 54 and 55 supplied with air via conduits 56 from a motor compressor unit 59. As shown in FIG. 4 of the drawings, the trolley 51 is stabilized horizontally by air float devices 60 and 61 are supported by brackets 63 and 64 respectively and supplied by air via tubes 65. The lower end 66 of mast 50 is provided with rollers 67 engaging a guide rail 68 located centrally of the work aisle to stabilize the mast in a transverse vertical plane.

Trolley 51 is driven longitudinally of the supporting surfaces 52 and 53 by traction wheel 69 mounted on an arm 70 and pivoted at 71 to the trolley. The wheel 69 engages supporting surface 53 and is driven by a motor 72 via a chain 73.

Thus, the traction wheel 69 is floatably mounted to permit relative vertical movement between the carriage or trolley 51 and the traction wheel 69. From the foregoing it is seen that the invention provides a novel supporting structure for a stacker whereby the stacker may be positively positioned whenever a load is being inserted into or retrieved from storage racks. Moreover, the invention facilitates the control of vertical alignment of the stacker during movement along the aisle between the racks.

I now claim:

1. A stacker and rack apparatus comprising in combination a pair of rows of high racks, a stacker including a carriage and a stacker mast mounted on said carriage at the base of said mast, said stacker movable longitudinally between the racks, a hoist mechanism mounted on said stacker mast and a transfer mechanism mounted on said hoist mechanism for projecting and retracting a load onto and off said racks, a support means adjacent to the base of said racks and extending parallel thereto, air bearing means mounted on said carriage and overlying said support means for supporting said stacker on a film of air, traction means on said carriage for driving said stacker parallel to said racks, means for floatably mounting said traction means on said carriage permitting relative vertical movement therebetween, first guide means at the upper end of said stacker mast for horizontally guiding said stacker, second guide means located at the base of said racks, and second guide means on each side of said carriage respectively cooperating with said second guide means at the base of said racks for horizontally guiding said stacker.

2. A stacker and rack apparatus as claimed in claim 1 having means for discontinuing the supply of air to bearing means when said traction means are stationary.

3. A stacker and rack apparatus as claimed in claim 1 in which said traction means includes traction wheels, a motor and a speed reduction means in driving relationship between said motor and traction wheels.

4. A traction and rack apparatus as claimed in claim 1 in which said first and second guide means are constructed to permit relative vertical movement between the stacker mast and said first guide means and between the carriage and said second guide means when air is applied to said air bearing means.

* * * * *